(12) United States Patent
Ishida (10) Patent No.: US 9,330,482 B2
(45) Date of Patent: May 3, 2016

(54) DISPLAY APPARATUS AND DISPLAY METHOD FOR CAPTURING HAND-DRAWN IMAGES

(71) Applicant: SEIKO EPSON CORPORATION, Tokyo (JP)

(72) Inventor: Hirokazu Ishida, Fujimi-machi (JP)

(73) Assignee: SEIKO EPSON CORPORATION, Tokyo (JP)

( * ) Notice: Subject to any disclaimer, the term of this patent is extended or adjusted under 35 U.S.C. 154(b) by 12 days.

(21) Appl. No.: 14/179,327

(22) Filed: Feb. 12, 2014

(65) Prior Publication Data

US 2014/0225846 A1  Aug. 14, 2014

(30) Foreign Application Priority Data

Feb. 12, 2013  (JP) .................................. 2013-024620

(51) Int. Cl.
*G06F 3/041* (2006.01)
*G06T 11/20* (2006.01)
*G06K 9/22* (2006.01)

(52) U.S. Cl.
CPC .............. *G06T 11/203* (2013.01); *G06K 9/222* (2013.01)

(58) Field of Classification Search
CPC ..................... G06F 3/0487; G06F 2203/04105

USPC .......................................... 345/156, 173–178
See application file for complete search history.

(56) References Cited

U.S. PATENT DOCUMENTS

| 5,434,959 A | * | 7/1995 | Von Ehr et al. | ................ | 345/441 |
| 2008/0180410 A1 | * | 7/2008 | McCall et al. | ................ | 345/179 |
| 2010/0117994 A1 | | 5/2010 | Fukushima et al. | | |
| 2013/0226504 A1 | * | 8/2013 | George et al. | ................ | 702/138 |

FOREIGN PATENT DOCUMENTS

| JP | 60-074015A A | 4/1985 |
| JP | 61-107419 A | 5/1986 |
| JP | 05-282094 A | 10/1993 |
| JP | 2001-266071 A | 9/2001 |
| JP | 2004-078366 A | 3/2004 |
| JP | 2010-117943 A | 2/2010 |
| JP | 2011-238067 A | 11/2011 |
| JP | 2012-138049 A | 7/2012 |
| WO | 2011-142122 A | 11/2011 |

* cited by examiner

*Primary Examiner* — Ram Mistry
(74) *Attorney, Agent, or Firm* — Maschoff Brennan (57) ABSTRACT

A control unit detects first coordinates, second coordinates, and third coordinates in this order, and renders a line based on a writing pressure at the time of detecting the second coordinates, on a writing pressure at the time of detecting the third coordinates, and on the direction of a line segment connecting between the first coordinates and the second coordinates.

16 Claims, 6 Drawing Sheets

DISPLAY APPARATUS AND DISPLAY METHOD FOR CAPTURING HAND-DRAWN IMAGES

BACKGROUND

1. Technical Field

The present invention relates to a technique to display hand-drawn images.

2. Related Art

One example of inventions for displaying hand-drawn characters is the invention disclosed in JP-A-2012-138049, which is an example of related art.

The invention of JP-A-2012-138049 analyzes a trajectory of a movement of a finger or a stylus on a screen and displays "stop", "sweep" and "flick" on the screen. According to the invention of JP-A-2012-138049, in the cases of "sweep" and "flick", a rendered line is thinned in a stroke end portion and therefore resembles a line drawn with a brush. On the other hand, in the case of "stop", a line is stopped in a stroke end portion and therefore resembles a line drawn with a brush.

Incidentally, the invention of JP-A-2012-138049 performs rendering with a constant line width during a finger movement. Here, in the cases of "sweep" and "flick", a line is thinned from a position where a moving direction changed toward a position where the finger was released from the screen, and becomes the thinnest at the position where the finger was released from the screen. Furthermore, according to the invention of JP-A-2012-138049, in the case of "stop", a line width is the same as a line width for rendering during the finger movement. Therefore, in the invention of JP-A-2012-138049, if the distance from the position where the moving direction of the finger changed to the position where the finger was released from the screen is the same, "sweep" and "flick" have the same shape whoever the operator is. Furthermore, in the invention of JP-A-2012-138049, "stop" also has the same line width and hence the same shape whoever the operator is. However, in the case where a line is drawn on a paper with a writing instrument, the line rarely has the same shape in a stroke end portion if drawn by different writers.

SUMMARY

An advantage of some aspects of the invention is that an end portion of a hand-drawn line is rendered in accordance with execution of writing.

According to one aspect of the invention contributing to the advantage, a display apparatus includes a display area, an acquisition unit, a storage unit, and a rendering unit. In the display area, an image is displayed. The acquisition unit acquires, at a predetermined frequency, coordinates on the display area that have been indicated by an indicating apparatus and a pressure applied to a contact portion of the display area by the indicating apparatus that comes into contact with the display area. The storage unit stores the coordinates and the pressure acquired by the acquisition unit in a plurality of sets. The rendering unit renders a line connecting the coordinates stored in the storage unit on the display area, and renders a stroke end portion that follows the line based on the coordinates and the pressures stored in the storage unit.

In this configuration, the line and the stroke end portion are rendered based on coordinates indicated by the indicating apparatus and on a pressure applied to the contact portion of the indicating apparatus. Therefore, an end portion of a hand-drawn line can be rendered in accordance with execution of writing.

It is preferable that the rendering unit determines a line width of the stroke end portion at a start point of the stroke end portion in accordance with a pressure stored in correspondence with coordinates of the start point, and decreases the line width of the stroke end portion from the start point toward an end point of the stroke end portion.

In this configuration, the stroke end portion is decreased in width from the start point toward the end point. Therefore, flick and sweep can be displayed.

It is preferable that, when the pressures stored in the storage unit are on the decrease toward a start point of the stroke end portion, the rendering unit decreases a line width of the stroke end portion toward an endpoint of the stroke end portion.

In this configuration, the stroke end portion is decreased in width from the start point toward the end point. Therefore, flick and sweep can be displayed.

It is preferable that the rendering unit changes a degree at which the line width of the stroke end portion is decreased in accordance with a pressure stored prior to rendering of the stroke end portion.

In this configuration, the degree at which the stroke end portion is decreased in width changes in accordance with a pressure before the stroke end portion. Therefore, various stroke end portions can be rendered by changing a pressure.

It is preferable that the rendering unit changes the degree at which the line width of the stroke end portion is decreased in accordance with the pressure stored in correspondence with the coordinates of the start point of the stroke end portion.

In this configuration, the degree at which the stroke end portion is decreased in width changes in accordance with the pressure stored in correspondence with the coordinates of the start point of the stroke end portion. Therefore, various stroke end portions can be rendered by changing a pressure at the start point of the stroke end portion.

It is preferable that the rendering unit changes the degree at which the line width of the stroke end portion is decreased based on a plurality of pressures stored prior to rendering of the stroke end portion.

In this configuration, the degree at which the stroke end portion is decreased in width changes in accordance with the plurality of pressures stored in correspondence with the coordinates stored before the coordinates of the start point of the stroke end portion. Therefore, various stroke end portions can be rendered by changing a pressure before the start point of the stroke end portion.

It is preferable that the rendering unit decreases a width of a line rendered at the stroke end portion at a predetermined degree.

In this configuration, the stroke end portion is decreased in width from the start point toward the end point. Therefore, flick and sweep can be displayed.

It is preferable that the rendering unit determines a direction of a line of the stroke end portion based on a plurality of sets of coordinates stored prior to rendering of the stroke end portion.

In this configuration, the direction of the line at the stroke end portion is determined in accordance with a movement of the indicating apparatus before the stroke end portion. Therefore, the direction of the line at the stroke end portion can be changed to various directions by changing the movement of the indicating apparatus before the stroke end portion.

It is preferable that the rendering unit changes a direction of a line of the stroke end portion based on coordinates of a start point of the stroke end portion and on coordinates that are acquired after the coordinates of the start point when a pressure is zero.

In this configuration, the direction of the line at the stroke end portion is determined in accordance with a movement of the indicating apparatus after the start of stroke end portion. Therefore, the direction of the line at the stroke end portion can be changed to various directions by changing the movement of the indicating apparatus after the start of stroke end portion.

It is preferable that the rendering unit increases a width of an end portion of the rendered line based on the coordinates stored in the storage unit.

In this configuration, the width of the end portion of the rendered line is increased, and therefore stop can be displayed.

It is preferable that the rendering unit increases the width of the end portion of the rendered line when the pressures stored in the storage unit are on the increase toward the end portion of the rendered line, or when a pressure at the end portion is the same as a pressure stored immediately therebefore.

In this configuration, the width of the end portion of the rendered line is increased when a pressure increases or remains the same toward the end portion of the rendered line. Therefore, stop can be displayed.

According to another aspect of the invention, a display method is also conceivable in addition to the display apparatus.

BRIEF DESCRIPTION OF THE DRAWINGS

The invention will be described with reference to the accompanying drawings, wherein like numbers reference like elements.

DESCRIPTION OF EXEMPLARY EMBODIMENTS

First Embodiment

Figure 1:
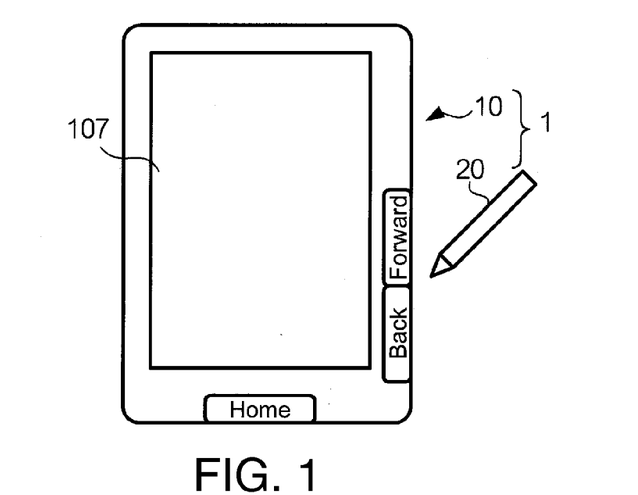
FIG. 1 shows external appearances of a display apparatus and a stylus pen according to an embodiment of the invention.

FIG. 1 shows apparatuses constituting a display system 1 according to one embodiment of the invention. As shown in FIG. 1, the display system 1 is constituted by a display apparatus 10 and a stylus pen 20.

The stylus pen 20 functions as a coordinate indicating apparatus that indicates coordinates in a digitizer using an electromagnetic induction method, and includes an electronic circuit for detecting a pressure (writing pressure) applied to a tip thereof.

The display apparatus 10 has an electrophoretic electronic paper 107 as a display, and displays images such as characters, photographs and graphics. The display apparatus 10 also has a sensor that detects coordinates and a writing pressure of the tip of the stylus pen 20, that is to say, a sensor in the digitizer using the electromagnetic induction method, on a back surface side of the display. The display apparatus 10 has a function of displaying a hand-drawn image. When the stylus pen 20 is moved on the electronic paper 107 of the display apparatus 10, the display apparatus 10 detects positional coordinates and a writing pressure of the tip of the moved stylus pen 20 using the sensor, and displays a hand-drawn image in accordance with a trajectory of the movement of the stylus pen 20 based on the detected coordinates and writing pressure.

Note that the stylus pen 20 and the sensor that realize the functions of the digitizer in the present embodiment may, for example, adopt commonly known configurations such as a position indicator and a position detecting apparatus disclosed in JP-A-2010-117943.

Figure 2:
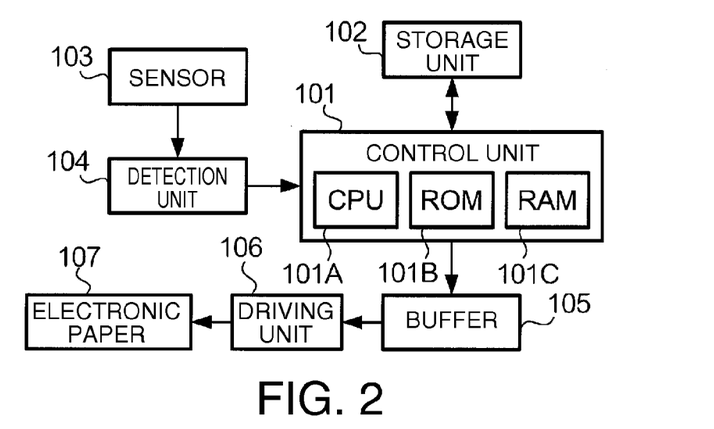
FIG. 2 is a block diagram showing a hardware configuration of a display apparatus 10.

FIG. 2 shows a hardware configuration of the display apparatus 10. A sensor 103 is a sheet-like sensor that detects coordinates and a writing pressure of the tip of the stylus pen 20 using an electromagnetic induction method. The sensor 103 is disposed on the side of the electronic paper 107 opposite to the side thereof on which an image is displayed. In the present embodiment, an area in which the sensor 103 detects the coordinates and the writing pressure coincides with a display area of the electronic paper 107. Alternatively, the sensor 103 may detect the coordinates and the writing pressure of the tip of the stylus pen 20 in an area larger than the display area of the electronic paper 107.

A detection unit 104 drives the sensor 103 at a predetermined frequency, and analyzes a signal output from the sensor 103. The detection unit 104 acquires first data indicating a pressure (writing pressure) at which the tip of the stylus pen 20 comes into contact with a front surface of the electronic paper 107 by analyzing the signal output from the sensor 103, and outputs the first data to a control unit 101. The detection unit 104 also acquires second data indicating coordinates of the tip of the stylus pen 20 by analyzing the signal output from the sensor 103, and outputs the second data to the control unit 101.

Note that the detection unit 104 acquires the first data and the second data at a predetermined frequency. At a single acquisition timing, a dataset including the first data and the second data is acquired. In the present embodiment, the first data and the second data are acquired a maximum of 133 times per second. However, the maximum number of times the first data and the second data are acquired per second is not limited to 133, and may be any other number.

In the present embodiment, the first data takes one of 256 values from 0 to 255. When the tip of the stylus pen 20 is out of contact with the front surface of the electronic paper 107, the value of the first data is "0". The value of the first data increases as the writing pressure increases. Note that the first data is not limited to taking one of 256 values. Alternatively, the first data may take, for example, one of 1024 values from 0 to 1023.

A value of the second data indicates coordinates of the tip of the stylus pen 20. In the present embodiment, a bottom left corner of the display area of the electronic paper 107 shown in FIG. 1 is regarded as the origin of a Cartesian coordinate system. A rightward direction from the origin represents a positive X-axis direction of coordinates, and an upward direction from the origin represents a positive Y-axis direction of coordinates.

The electronic paper 107 is an electrophoretic electronic paper on which pixels are arrayed in a plurality of rows and a plurality of columns, and displays images such as characters, photographs and graphics. Note that in the present embodiment, each pixel performs display in one of two tones, that is to say, in black or white.

A buffer (image frame buffer) 105 is a memory that stores a tone of each pixel. The buffer 105 includes storage areas that each store a tone value of a corresponding pixel on the electronic paper 107. The control unit 101 writes data indicating a tone of each pixel into the corresponding storage area.

A driving unit 106 includes a driving circuit for driving the electronic paper 107. The driving unit 106 reads data of a tone of each pixel stored in the buffer 105, and drives the electronic paper 107 based on the read data. For example, if a value of data written into a storage area is zero, the driving unit 106 drives the electronic paper 107 so as to make a pixel corresponding to this storage area white. If a value of data written into a storage area is one, the driving unit 106 drives the electronic paper 107 so as to make a pixel corresponding to this storage area black.

A storage unit 102 includes a non-volatile memory, and stores image data representing an image to be displayed by the display apparatus 10.

The control unit 101 is a microcomputer including a CPU (central processing unit) 101A, a ROM (read-only memory) 101B, and a RAM (random-access memory) 101C. When the CPU 101A reads a program stored in the ROM 101B and executes the read program using the RAM 101C as a working area, the display apparatus 10 realizes a function of displaying an image of image data stored in the storage unit 102. Furthermore, in the display apparatus 10, when the CPU 101A executes a program stored in the ROM 101B, a function of acquiring the first data and the second data and displaying a hand-drawn image based on the acquired first data and second data is realized.

Moreover, in the display apparatus 10, a function of changing a line width for display of a hand-drawn image is realized. In this function, a user of the display apparatus 10 selects one of 2 pixels, 4 pixels, 8 pixels and 16 pixels as a line width of a hand-drawn line to be rendered at the time of a predetermined writing pressure (for example, at the time when a value of the first data is 127). After the user has selected the line width, when a detected writing pressure matches the predetermined writing pressure, the display apparatus 10 sets a hand-drawn line width to the line width selected by the user. If the value of the first data changes, the display apparatus 10 changes the hand-drawn line width in accordance with the value of the first data.

Figure 3:
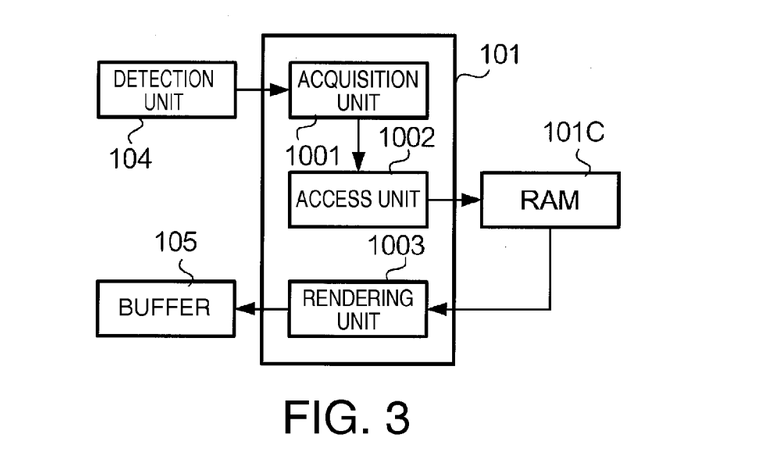
FIG. 3 is a functional block diagram showing configurations of functions realized in the display apparatus 10.

FIG. 3 is a functional block diagram showing configurations of functions realized in the display apparatus 10 in the present embodiment.

An acquisition unit 1001 acquires first data and second data output from the detection unit 104. An access unit 1002 writes the data acquired by the acquisition unit 1001 into the RAM 101C. A rendering unit 1003 renders a line connecting coordinates indicated by the second data stored in the RAM 101C based on the first data and the second data stored in the RAM 101C. The rendering unit 1003 also renders a stroke end portion that follows the rendered line (a portion corresponding to "flick" and "sweep") based on the first data and the second data stored in the RAM 101C.

Figure 4:
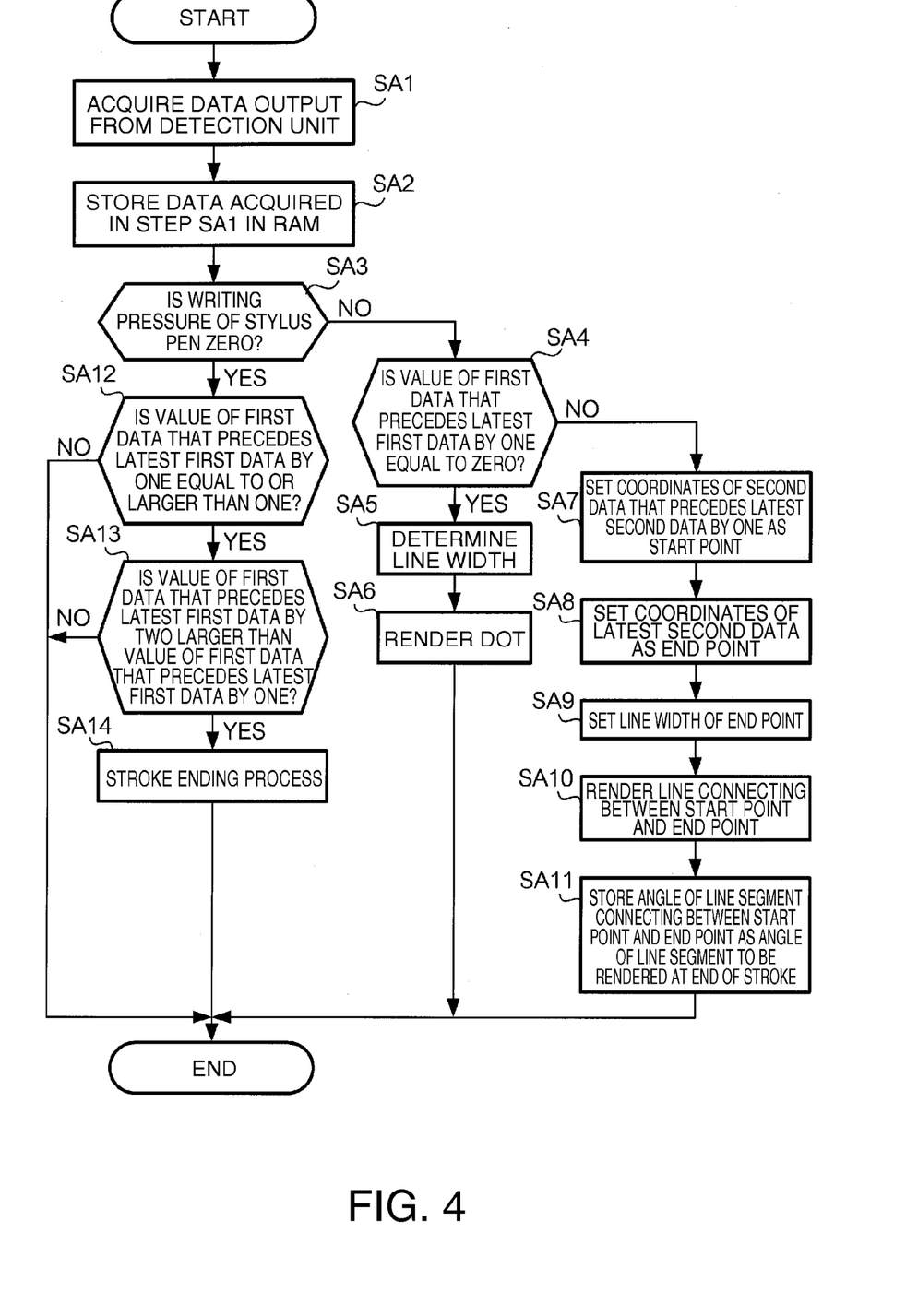
FIG. 4 is a flowchart showing a flow of processing executed by a control unit 101.

The following describes exemplary operations according to the present embodiment. FIG. 4 is a flowchart showing a flow of processing that is executed by the display apparatus 10 to display a hand-drawn image. In the display apparatus 10, the detection unit 104 drives the sensor 103, acquires first data and second data at a predetermined frequency, and outputs the first data and the second data to the control unit 101. The control unit 101 executes the processing shown in FIG. 4 each time first data and second data are output from the detection unit 104.

First, the control unit 101 acquires first data and second data output from the detection unit 104 (step SA1: acquisition step). Upon newly acquiring the first data and the second data in step SA1, the control unit 101 stores the first data and the second data acquired in step SA1 in the RAM 101C (step SA2: storing step). Through this process, the acquired first data and second data are stored in the RAM 101C in order of acquisition. That is to say, a plurality of datasets including first data and second data are stored in the RAM 101C. Hereinafter, the datasets stored in order will be referred to as dataset A, dataset B, dataset C, and so on. The RAM 101C is one example of a storage unit for storing the first data and the second data. Alternatively, the control unit 101 may store the acquired first data and second data in the storage unit 102.

Next, the control unit 101 determines whether or not the writing pressure of the stylus pen 20 is zero. More specifically, if a value of the latest first data stored in the RAM 101C (first data in the dataset C) is equal to or larger than one, the control unit 101 determines that the stylus pen 20 is in contact with the front surface of the electronic paper 107 and the writing pressure is not zero (NO of step SA3). On the other hand, if the value of the latest first data stored in the RAM 101C (the first data in the dataset C) is zero, the control unit 101 determines that the stylus pen 20 is out of contact with the front surface of the electronic paper 107 and the writing pressure is zero (YES of step SA3).

If the control unit 101 determines NO in step SA3, it determines whether or not a value of first data stored in the RAM 101C immediately before the latest first data (first data in the dataset B) is zero, that is to say, whether or not the stylus pen 20 was in contact with the front surface of the electronic paper 107 before the latest first data and second data were acquired. More specifically, if the value of the first data stored in the RAM 101C immediately before the latest first data (the first data in the dataset B) is zero, the control unit 101 determines that the stylus pen 20 was out of contact with the front surface of the electronic paper 107 before the latest first data was acquired (YES of step SA4).

If the control unit 101 determines YES in step SA4, it determines a line width of a hand-drawn line to be rendered (step SA5). Note that in the present embodiment, the control unit 101 increases a line width in proportion to a value of first data, and uses a line width set by a user when the value of first data is 127. In an exemplary case where the line width set by the user is 8 pixels, the line width is 8 pixels when the value of first data is 127, and the line width is 16 pixels when the value of first data is 255. In another exemplary case where the line width set by the user is 4 pixels, the line width is 4 pixels when the value of first data is 127, and the line width is 8 pixels when the value of first data is 255.

Next, the control unit 101 renders a dot at coordinates of the latest second data stored (second data in the dataset C) (step SA6). More specifically, the control unit 101 identifies pixels that fall within a rectangular range that has the width determined in step SA5 both in the X-axis direction and the Y-axis direction and that is centered around the coordinates of the latest second data (the second data in the dataset C). The control unit 101 then accesses the buffer 105 and writes, into the storage areas corresponding to the identified pixels, data for making the tones of the pixels back. For example, in the case where the coordinates of the second data are (X1, Y1) and the determined line width is eight pixels, the control unit 101 identifies pixels of eight rows by eight columns centered around (X1, Y1), and writes, into the storage areas corresponding to the identified pixels, data for making the tones of the pixels black.

Once the content of the buffer 105 is changed, the driving unit 106 drives the electronic paper 107 in accordance with the content of the buffer 105. As a result, on the electronic paper 107, a black rectangular dot is rendered with a line width corresponding to the writing pressure at a position with which the tip of the stylus pen 20 came into contact.

On the other hand, if the value of the first data stored in the RAM 101C immediately before the latest first data (the first data in the dataset B) is equal to or larger than one (NO of step SA4), the control unit 101 determines that the stylus pen 20 was in contact with the front surface of the electronic paper 107 before the latest first data and second data (the dataset C) were acquired. In this case, the control unit 101 sets coordinates of second data stored immediately before the latest second data (second data in the dataset B) as a start point (step SA7). The control unit 101 also sets the coordinates of the latest second data (the second data in the dataset C) as an end point (step SA8). After setting the end point, the control unit 101 sets a line width at the end point using the latest first data (the first data in the dataset C) similarly to step SA5 (step SA9).

Upon completion of the process of step SA9, the control unit 101 renders a line connecting between the start point set in step SA7 and the endpoint set in the step SA8 (step SA10: rendering step).

More specifically, the control unit 101 interpolates points between the start point and the endpoint, and determines a line width at the interpolated points using the following equation.

Line width at interpolated point=(line width at start point+distance to interpolated point in X-axis direction)/distance from start point to end point in X-axis direction)

Note that "distance from start point to interpolated point in X-axis direction" and "distance from start point to end point in X-axis direction" in the equation may be replaced with "distance from start point to interpolated point in Y-axis direction" and "distance from start point to end point in Y-axis direction", respectively.

Thereafter, the control unit 101 identifies pixels corresponding to a line segment that passes through the interpolated points and connects between the start point and the end point. Here, the control unit 101 identifies the pixels such that the line width determined using the equation is used for the interpolated points. The control unit 101 then accesses the buffer 105 and writes, into the storage areas corresponding to the identified pixels, data for making the tones of the pixels black. The control unit 101 uses the line width set in step SA9 for the end point.

Note that the line width at the interpolated points is not limited to the line width determined using the equation. For example, a line width at the start point is determined from a value of first data at the start point similarly to step SA5, and a line width at the end point is determined from a value of first data at the end point similarly to step SA5. A line width between the start point and the end point may be increased or decreased in accordance with the line width at the start point and the line width at the end point.

The driving unit 106 drives the electronic paper 107 in accordance with the content of the buffer 105. As a result, on the electronic paper 107, a black line segment connecting between the start point and the end point is rendered with a line width corresponding to the writing pressure.

Upon completion of the process of step SA10, the control unit 101 identifies an angle of the line segment connecting between the start point and the end point, and stores the identified angle as an angle of a line segment to be rendered at the end of a stroke (step SA11). In the present embodiment, it is assumed that an angle of a line segment from the start point is zero when the line segment extends in the positive X-axis direction, and increases as the line segment rotates counter-clockwise.

Returning to step SA3, a description will now be given of exemplary operations for the case where the value of the latest first data (the first data in the dataset C) is zero, that is to say, the case where the detected writing pressure is zero. If the control unit 101 determines YES in step SA3, it determines whether or not the stylus pen 20 was in contact with the front surface of the electronic paper 107 before the latest first data and second data (the dataset C) were acquired. More specifically, if the value of the first data that precedes the latest first data by one (the first data in the dataset B) is zero, the control unit 101 determines that the stylus pen 20 was out of contact with the front surface of the electronic paper 107 before the latest first data and second data were acquired (NO of step SA12). In this case, the control unit 101 ends the processing of FIG. 4.

On the other hand, if the control unit 101 determines YES in step SA12, it determines whether or not a value of first data that precedes the latest first data (the first data in the dataset C) by two (first data in the data set A) is larger than the value of the first data that precedes the latest first data by one (the first data in the dataset B). If the value of the first data that precedes the latest first data by two is smaller than the value of the first data that precedes the latest first data by one (NO of step SA13), the control unit 101 ends the processing of FIG. 4.

On the other hand, if the value of the first data that precedes the latest first data by two (the first data in the dataset A) is larger than the value of the first data that precedes the latest first data by one (the first data in the dataset B) (YES of step SA13), the control unit 101 executes a stroke ending process (step SA14: rendering step). More specifically, the control unit 101 first identifies a line width at the coordinates of the second data that precedes the latest second data by one (the second data in the dataset B) using the first data that precedes the latest first data by one (the first data in the dataset B) similarly to step SA5. The control unit 101 then identifies pixels corresponding to a line segment whose line width is decreased at a predetermined degree from the coordinates of the second data that precedes the latest second data by one (a start point of a stroke end portion) in the direction of the angle stored in step SA11, and writes, into the storage areas corresponding to the identified pixels, data for making the tones of the pixels black.

In the present embodiment, it is assumed that the degree at which a line width is decreased is such that, each time a line is rendered by one pixel in the direction of the angle stored in step SA11, the line width is decreased by one pixel.

Figure 5:
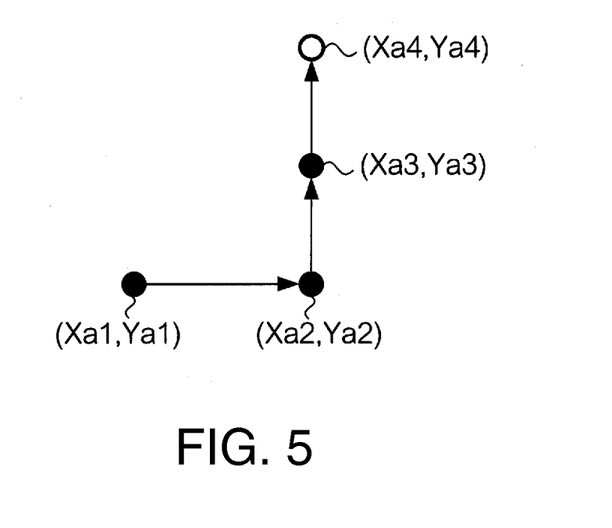
FIG. 5 shows coordinates of a stylus pen 20.

For example, assume the case where, due to the execution of writing of "flick" with the stylus pen 20, coordinates have changed in the following order as shown in FIG. 5: coordinates (Xa1, Ya1), coordinates (Xa2, Ya2), coordinates (Xa3, Ya3), and coordinates (Xa4, Ya4). In FIG. 5, it is assumed that, after the direction of the execution of writing is changed at the coordinates (Xa2, Ya2), the stylus pen 20 remains in contact with the electronic paper 107 until the coordinates (Xa3, Ya3), and then the writing pressure becomes zero at the coordinates (Xa4, Ya4). In FIG. 5, it is also assumed that the value of first data at the coordinates (Xa2, Ya2) is larger than the value of first data at the coordinates (Xa3, Ya3).

When the control unit 101 acquires second data indicating the coordinates (Xa3, Ya3) as the latest second data, it stores the direction of a line segment connecting between the coordinates (Xa2, Ya2) and the coordinates (Xa3, Ya3) in step SA11. Thereafter, when the control unit 101 acquires second data indicating the coordinates (Xa4, Ya4) as the latest second data, the value of the latest first data is "zero". At this time, the value of first data that precedes the latest first data by two is larger than the value of first data that precedes the latest first data by one. In this case, the control unit 101 determines YES in step SA3, YES in step SA12, and YES in step SA13. The control unit 101 identifies a line width at the coordinates (Xa3, Ya3) using the first data corresponding to the second data indicating the coordinates (Xa3, Ya3). The control unit 101 identifies pixels corresponding to a line segment whose line width is decreased one pixel at a time from the coordinates of the second data that precedes the latest second data by one in the direction having the angle stored in step SA11, and writes, into the storage areas corresponding to the identified pixels, data for making the tones of the pixels black.

When the driving unit 106 subsequently drives the electronic paper 107 in accordance with the content of the buffer 105, a line segment with a decreasing line width is rendered on the electronic paper 107 from the coordinates (Xa3, Ya3), in the direction of the line segment connecting between the coordinates (Xa2, Ya2) and the coordinates (Xa3, Ya3), as exemplarily shown in FIG. 6.

Note that if the value of the first data at the coordinates (Xa3, Ya3) is large, a line width at the coordinates (Xa3, Ya3) is large, and therefore the distance from the coordinates (Xa3, Ya3) to coordinates at which the line width becomes one pixel is increased. On the other hand, if the value of the first data at the coordinates (Xa3, Ya3) is small, a line width at the coordinates (Xa3, Ya3) is small, and therefore the distance from the coordinates (Xa3, Ya3) to coordinates at which the line width becomes one pixel is decreased. That is to say, the width and the length of a line at a stroke end portion change in accordance with a writing pressure prior to the release of the stylus pen 20 from the electronic paper 107. In this way, the line at the stroke end portion comes in a wide variety.

Figure 6:
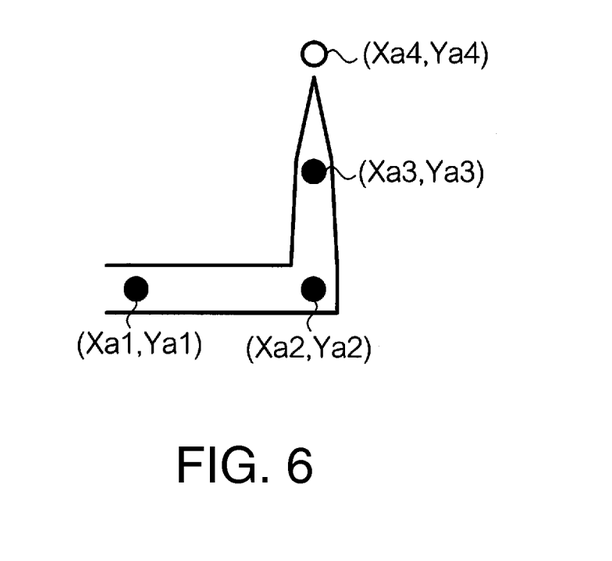
FIG. 6 shows one example of a stroke end portion.

While FIGS. 5 and 6 show exemplary operations for the case of "flick", a line with a decreasing width is rendered in the stroke ending process of step SA14 also in the case of "sweep" in the present embodiment.

Second Embodiment

A description is now given of a second embodiment of the invention. In the second embodiment, processing executed by the control unit 101 differs from that of the first embodiment, but other configurations are the same as those of the first embodiment. Therefore, the following describes differences from the first embodiment. Below, configurations that are the same as those of the first embodiment are given the same reference signs thereas, and a description thereof is omitted.

Figure 7:
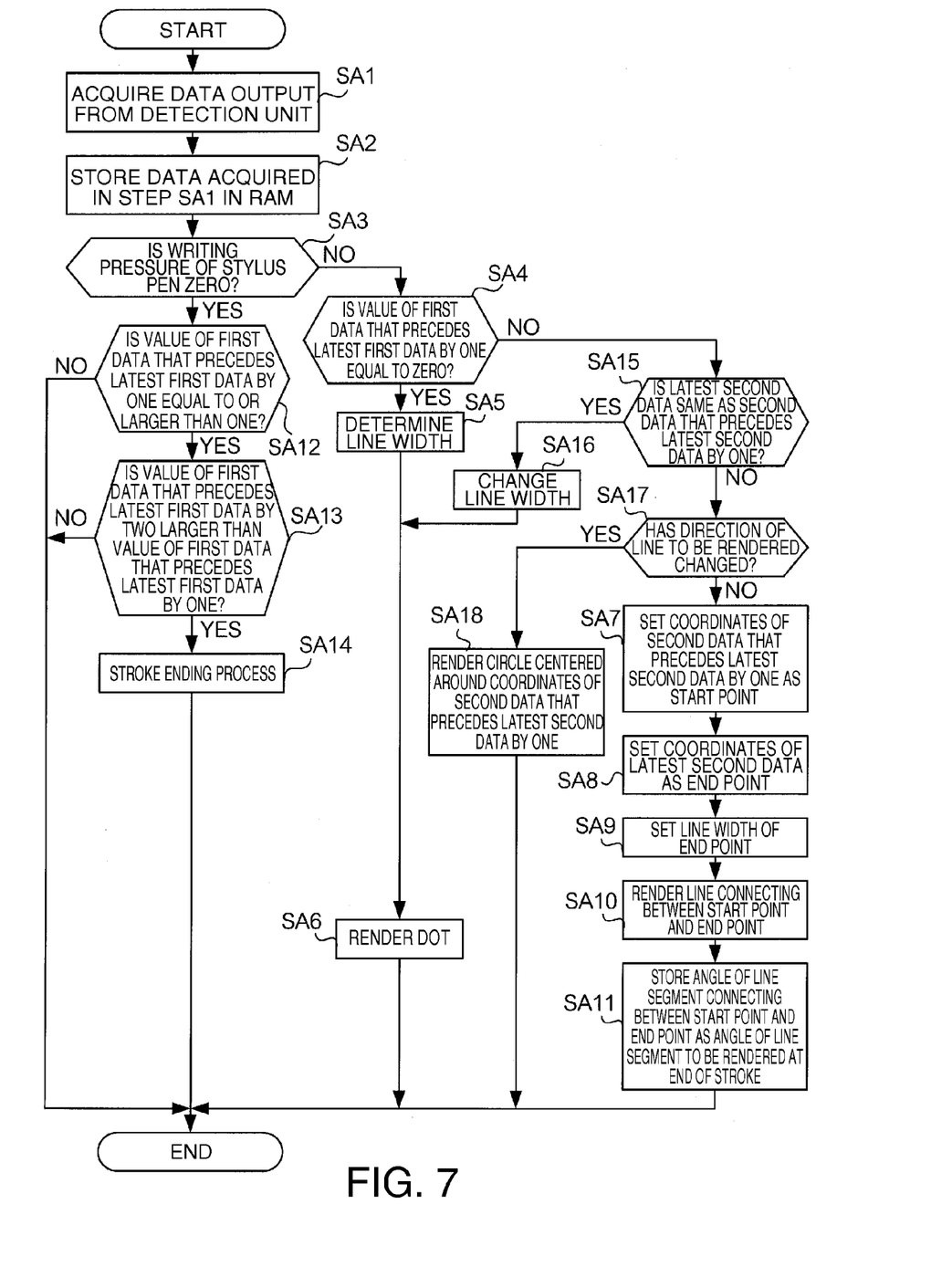
FIG. 7 is a flowchart showing a flow of processing executed by the control unit 101 according to a second embodiment.

FIG. 7 is a flowchart showing a flow of processing that is executed by the display apparatus 10 according to the second embodiment to display a hand-drawn image. The processing of FIG. 7 differs from that of the first embodiment in a flow of processes that follow when the result of determination in step SA4 is NO.

If the control unit 101 determines NO in step SA4, it determines whether or not the coordinates of the latest second data (the second data in the dataset C) are the same as the coordinates of the second data that precedes the latest second data by one (the second data in the dataset B). If the coordinates of the latest second data are the same as the coordinates of the second data that precedes the latest second data by one (YES of step SA15), the control unit 101 changes the width of a line that has already been rendered at the coordinates of the second data so as to thicken the line (step SA16).

On the other hand, if the control unit 101 determines NO in step SA15, it determines whether or not the direction of a line segment to be rendered has changed. More specifically, the control unit 101 determines whether or not the following directions are the same: the direction of a line segment connecting between the coordinates of the second data that precedes the latest second data by one (the second data in the dataset B) and the coordinates of the latest second data (the second data in the dataset C); and the direction of a line segment connecting between the coordinates of the second data that precedes the latest second data by two (second data in the dataset A) and the coordinates of the second data that precedes the latest second data by one (the second data in the dataset B). If the direction of the line segment connecting between the coordinates of the second data that precedes the latest second data by one and the coordinates of the latest second data is the same as the direction of the line segment connecting between the coordinates of the second data that precedes the latest second data by two and the coordinates of the second data that precedes the latest second data by one (NO of step SA17), the control unit 101 determines that the direction of a line to be rendered has not changed, and proceeds to the process of step SA7.

On the other hand, if the control unit 101 determines YES in step SA17, it renders a circle centered around the coordinates of the second data that precedes the latest second data by one (step SA18). More specifically, the control unit 101 determines a line width using the first data that precedes the latest first data by one (the first data in the dataset B). Next, the control unit 101 identifies pixels included in a circle that is centered around the coordinates of the second data that precedes the latest second data by one (the second data in the dataset B) and has a diameter equal to the determined line width. The control unit 101 then accesses the buffer 105 and writes, into the storage areas corresponding to the identified pixels, data for making the pixels black.

For example, if a movement of the stylus pen 20 is stopped while the stylus pen 20 remains in contact, that is to say, if "stop" is executed with the stylus pen 20, the latest second data is the same as the second data that precedes the latest second data by one. In this case, the control unit 101 determines YES in step SA15. The control unit 101 then increases the line width at the position of the tip of the stylus pen 20.

When "stop" is drawn with an ink brush, at the position where the brush is stopped, ink soaks into a paper and a line width increases. In the present embodiment, upon execution of writing of "stop", a line width at the position of the stop is increased similarly to the case of "stop" drawn with the ink brush, and therefore a displayed line resembles "stop" drawn with the ink brush.

Figure 8:
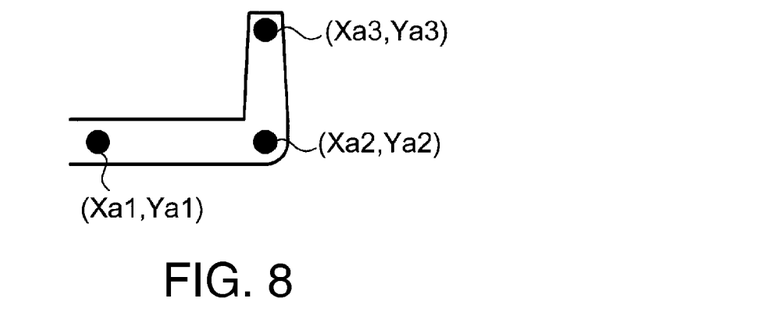
FIG. 8 shows one example of a rendered line.

Also, for example, assume the case where the execution of writing with the stylus pen 20 has caused coordinates to change in the following order as shown in FIG. 5: coordinates (Xa1, Ya1), coordinates (Xa2, Ya2), and coordinates (Xa3, Ya3). In this case, if the coordinates of the latest second data are (Xa3, Ya3), the control unit 101 determines YES in step SA17. The control unit 101 then renders a circle centered around the coordinates (Xa2, Ya2). Consequently, as exemplarily shown in FIG. 8, a corner portion of a line is rounded, and therefore the displayed line resembles a line drawn with a writing instrument.

Modification Examples

While the embodiments of the invention have been described above, the invention is by no means limited to the embodiments and can be implemented in various other embodiments. For example, the invention may be implemented by modifying the embodiments as follows. Note that the embodiments and the following modification examples may be combined.

In the embodiments, if the value of the first data that precedes the latest first data by two is larger than the value of the first data that precedes the latest first data by one, the control unit 101 determines YES in step SA13. However, a configuration for determination in step SA13 is not limited in this way. For example, the control unit 101 may compare first data that precedes the latest first data by one, first data that precedes the latest first data by two, and first data that precedes the latest first data by three, and may determine YES in step SA13 if the result of comparison shows that the values of these pieces of first data decrease in order from the first data that precedes the latest first data by three to the first data that precedes the latest first data by one.

Figure 9:
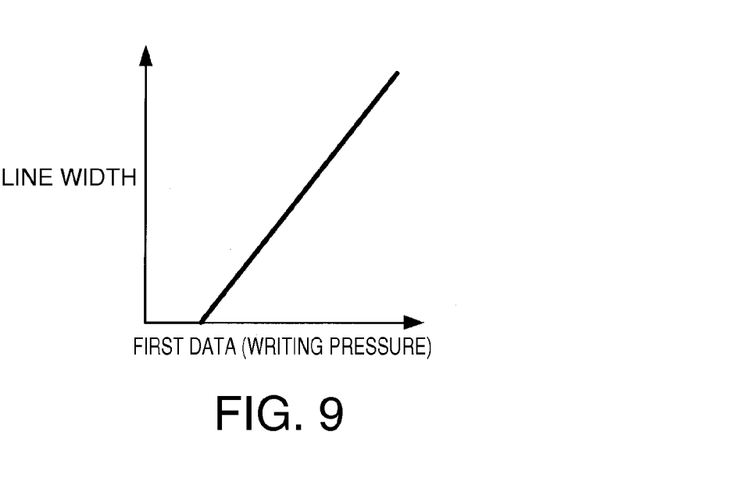
FIG. 9 shows a relationship between a line width of a rendered line and first data in a modification example.
Figure 10:
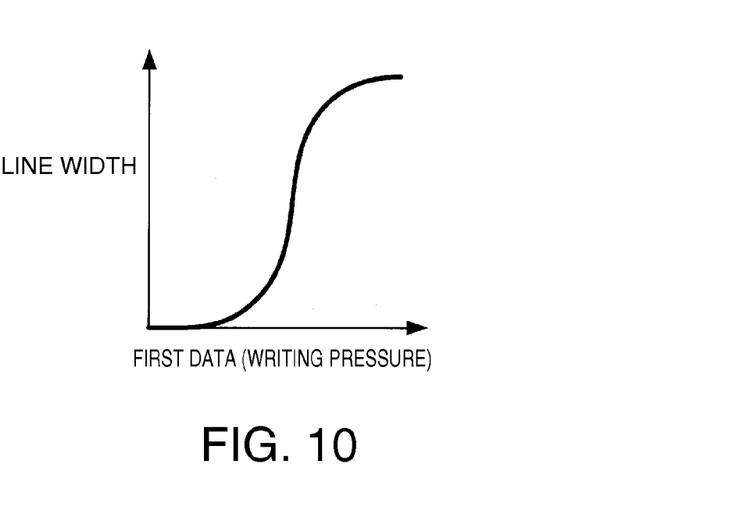
FIG. 10 shows a relationship between a line width of a rendered line and first data in a modification example.
Figure 11:
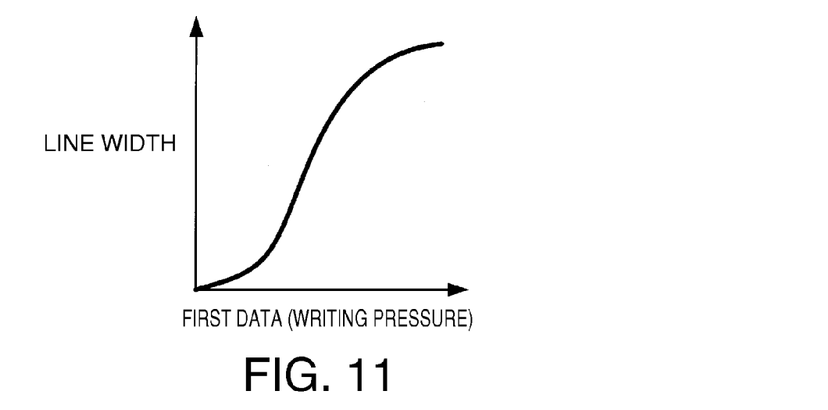
FIG. 11 shows a relationship between a line width of a rendered line and first data in a modification example.

In the embodiments, a line width is set in proportion to a value of first data. However, a configuration for setting a line width is not limited in this way. For example, as shown in FIG. 9, a line width may be zero until the value of the first data reaches a predetermined value, and may increase in accordance with the value of the first data when the value of the first data is equal to or larger than the predetermined value. Furthermore, as shown in FIGS. 10 and 11, the relationship between the first data and the line width may be non-linear.

In the embodiments, when a line is rendered in the stroke ending process, a line width is decreased one pixel at a time. However, the line width may be decreased two or three pixels at a time, instead of one pixel at a time.

Figure 12:
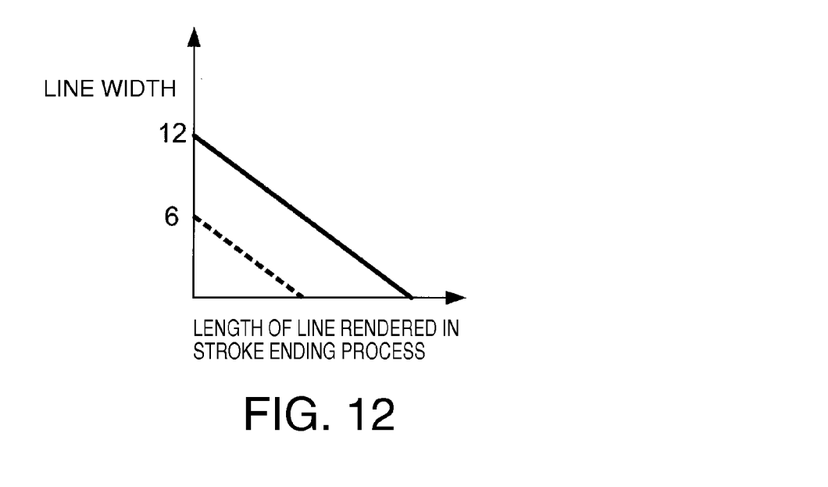
FIG. 12 shows a relationship between a length and a line width of a line in a stroke end portion in a modification example.

Furthermore, the line width may be decreased in the stroke ending process in different styles depending on line widths before the writing pressure becomes zero. More specifically, a table is set that defines the styles of decrease in the line width in correspondence with line widths before the writing pressure becomes zero, and the line width is changed in accordance with this table. FIG. 12 is a diagram that shows one example of this table. For example, if a line width before the writing pressure becomes zero is twelve pixels, the line width is decreased as the length of a line rendered in the stroke ending process increases as indicated by a solid line in FIG. 12. On the other hand, if a line width before the writing pressure becomes zero is six pixels, the line width is decreased as the length of a line rendered in the stroke ending process increases as indicated by a dash line in FIG. 12.

Figure 13:
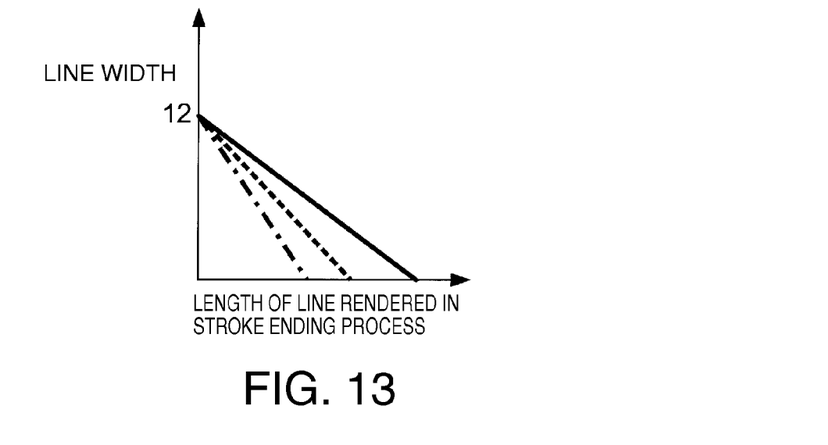
FIG. 13 shows a relationship between a length and a line width of a line in a stroke end portion in a modification example.

Furthermore, in the case where a line width in the stroke ending process is determined using a table, the line width may be decreased in different styles depending on values of first data that precedes first data with a value of zero by one. FIG. 13 is a diagram that shows one example of a table according to this modification example. For example, if the value of first data that precedes first data with a value of zero by one is smaller than 85, a line width of a line rendered in the stroke ending process is decreased in accordance with an alternate long and short dash line shown in FIG. 13. If the value of first data that precedes first data with a value of zero by one is equal to or larger than 85 and smaller than 170, a line width of a line rendered in the stroke ending process is decreased in accordance with a dash line shown in FIG. 13. If the value of first data that precedes first data with a value of zero by one is equal to or larger than 170, a line width of a line rendered in the stroke ending process is decreased in accordance with a solid line shown in FIG. 13.

Furthermore, in the case where a line width in the stroke ending process is determined using a table, the line width may be decreased in different styles depending on values of pieces of first data that precede first data with a value of zero by one and by two.

For example, in the case where the value of first data that precedes first data with a value of zero by two>the value of first data that precedes first data with a value of zero by one, a line width of a line rendered in the stroke ending process may be decreased: in accordance with the solid line shown in FIG. 13 if the difference between the two values is smaller than a first threshold; in accordance with the dash line shown in FIG. 13 if the difference between the two values is equal to or larger than the first threshold and smaller than a second threshold; and in accordance with the alternate long and short dash line shown in FIG. 13 if the difference between the two values is equal to or larger than the second threshold.

In the stroke ending process according to the embodiments, a line width is decreased, one pixel at a time, following the coordinates (Xa3, Ya3). However, a decrease in the line width is not limited to this configuration. The style of the decrease in the line width may be changed in accordance with the distance from the coordinates (Xa3, Ya3) to the coordinates (Xa4, Ya4). For example, in the case where the distance from the coordinates (Xa3, Ya3) to the coordinates (Xa4, Ya4) is long compared to the state shown in FIG. 5, the line width may be decreased by one pixel per rendering of three pixels in the direction from the coordinates (Xa3, Ya3) to the coordinates (Xa4, Ya4). On the other hand, in the case where the distance from the coordinates (Xa3, Ya3) to the coordinates (Xa4, Ya4) is short compared to the state shown in FIG. 5, the line width may be decreased by two pixels per rendering of one pixel in the direction from the coordinates (Xa3, Ya3) to the coordinates (Xa4, Ya4).

Note that the style of the decrease in the line width may be changed in accordance with the distance from the coordinates (Xa2, Ya2) to the coordinates (Xa3, Ya3), instead of the distance from the coordinates (Xa3, Ya3) to the coordinates (Xa4, Ya4). For example, in the case where the distance from the coordinates (Xa2, Ya2) to the coordinates (Xa3, Ya3) is long compared to the state shown in FIG. 5, the line width may be decreased by one pixel per rendering of three pixels in the direction of a line segment connecting between the coordinates (Xa2, Ya2) and the coordinates (Xa3, Ya3). On the other hand, in the case where the distance from the coordinates (Xa2, Ya2) to the coordinates (Xa3, Ya3) is short compared to the state shown in FIG. 5, the line width may be decreased by two pixels per rendering of one pixel in the direction of a line segment connecting between the coordinates (Xa2, Ya2) and the coordinates (Xa3, Ya3).

In the embodiments, lines corresponding to "flick" and "sweep" are rendered in the stroke ending process in the direction of a line that was rendered before the value of first data becomes zero. However, the direction in which the lines corresponding to "flick" and "sweep" are rendered is not limited in this way. For example, in the example shown in FIG. 5, the lines corresponding to "flick" and "sweep" may be rendered in the direction of a line segment connecting between the coordinates (Xa3, Ya3) and the coordinates (Xa4, Ya4). For example, in FIG. 5, if the coordinates (Xa4, Ya4) are located to the right of the position thereof shown in FIG. 5, a line segment rendered in the stroke ending process leans to the right compared to the line segment shown in FIG. 6, and if the coordinates (Xa4, Ya4) are located to the left of the position thereof shown in FIG. 5, a line segment rendered in the stroke ending process leans to the left compared to the line segment shown in FIG. 6.

In the second embodiment, a line width is changed if the latest second data is the same as the second data that precedes the latest second data by one in step SA15. However, the process of step SA16 may be executed if the following conditions are both satisfied: the latest second data is the same as the second data that precedes the latest second data by one; and the value of the latest first data is equal to or larger than the value of the first data that precedes the latest first data by one, that is to say, the writing pressure has increased or remained the same.

This application claims priority from Japanese Patent Application No. 2013-024620 filed in the Japanese Patent Office on Feb. 12, 2013, the entire disclosure of which is hereby incorporated by reference in its entirely.

What is claimed is:

1. A display apparatus comprising:
   a display area in which an image is displayed;
   an acquisition unit that acquires, at a predetermined frequency, coordinates on the display area that have been indicated by an indicating apparatus and a pressure applied to a contact portion of the display area by the indicating apparatus that comes into contact with the display area;
   a storage unit that stores the coordinates and the pressure acquired by the acquisition unit in a plurality of sets; and
   a rendering unit that renders a line connecting the coordinates stored in the storage unit on the display area, and renders a stroke end portion that follows the line based on the coordinates and the pressure stored in the storage unit,
   wherein the rendering unit renders the stroke end portion if there is pressure detected at an end point located at the end of the line and if the pressure stored in the storage unit of the end point is greater than a predetermined value and does not render the stroke end portion to the end of the line if there is pressure detected at the end point and the pressure stored in the storage unit of the end point is less than the predetermined value, and
   wherein the stroke end portion begins at the end point and extends beyond the end point to a predicted next point.

2. The display apparatus according to claim 1, wherein the rendering unit determines a line width of the stroke end portion at a start point of the stroke end portion in accordance with a pressure stored in correspondence with coordinates of the start point, and decreases the line width of the stroke end portion from the start point toward an end point of the stroke end portion.

3. The display apparatus according to claim 2, wherein the rendering unit changes a degree at which the line width of the stroke end portion is decreased in accordance with a pressure stored prior to rendering of the stroke end portion.

4. The display apparatus according to claim 3, wherein the rendering unit changes the degree at which the line width of the stroke end portion is decreased in accordance with the pressure stored in correspondence with the coordinates of the start point of the stroke end portion.

5. The display apparatus according to claim 3, wherein the rendering unit changes the degree at which the line width of the stroke end portion is decreased based on a plurality of pressures stored prior to rendering of the stroke end portion.

6. The display apparatus according to claim 2, wherein the rendering unit decreases a width of a line rendered at the stroke end portion at a predetermined degree.

7. The display apparatus according to claim 1, wherein when the pressures stored in the storage unit are on the decrease toward a start point of the stroke end portion, the rendering unit decreases a line width of the stroke end portion toward an end point of the stroke end portion.

8. The display apparatus according to claim 1, wherein the rendering unit determines a direction of a line of the stroke end portion based on a plurality of sets of coordinates stored prior to rendering of the stroke end portion.

9. The display apparatus according to claim 1, wherein the rendering unit changes a direction of a line of the stroke end portion based on coordinates of a start point of the stroke end portion and on coordinates that are acquired after the coordinates of the start point when a pressure is zero.

10. The display apparatus according to claim 1, wherein the rendering unit increases a width of an end portion of the rendered line based on the coordinates stored in the storage unit.

11. The display apparatus according to claim 10, wherein the rendering unit increases the width of the end portion of the rendered line when the pressures stored in the storage unit are on the increase toward the end portion of the rendered line, or when a pressure at the end portion is the same as a pressure stored immediately therebefore.

12. The display apparatus according to claim 1, wherein the stroke end portion is a line segment with a decreasing line width.

13. A display method comprising:
    acquiring, at a predetermined frequency, coordinates on a display area that have been indicated by an indicating apparatus and a pressure applied to a contact portion of the display area by the indicating apparatus that comes into contact with the display area, the display area displaying an image;
    storing the acquired coordinates and the acquired pressure in a plurality of sets; and
    rendering a line connecting the stored coordinates on the display area, and rendering a stroke end portion that follows the line based on the stored coordinates and the stored pressures,
    wherein the stroke end portion is rendered if there is pressure detected at an end point located at the end of the line and if the pressure stored in the storage unit of the end point is greater than a predetermined value and does not render the stroke end portion to the end of the line if there is pressure detected at the end point and the pressure stored in the storage unit of the end point is less than the predetermined value, and
    wherein the stroke end portion begins at the end point and extends beyond the end point to a predicted next point.

14. The display method according to claim 13, wherein the stroke end portion is a line segment with a decreasing line width.

15. A display apparatus comprising:
a display area in which an image is displayed;
an acquisition unit that acquires a first coordinate on the display area that is indicated by an indicating apparatus and a first pressure applied to a contact portion of the display area by the indicating apparatus that comes into contact with the display area at a first time, and acquires a second coordinate on the display area that is indicated by an indicating apparatus and a second pressure applied to a contact portion of the display area by the indicating apparatus that comes into contact with the display area at a second time after the first time; and
a rendering unit that renders a line connecting the first coordinate and the second coordinate on the display area, and renders a stroke end portion that follows the line based on the first coordinate, the first pressure, the second coordinate and the second pressure,
wherein the rendering unit renders the stroke end portion if there is pressure detected at an end point located at the end of the line and if the pressure stored in the storage unit of the end point is greater than a predetermined value and does not render the stroke end portion to the end of the line if there is pressure detected at the end point and the pressure stored in the storage unit of the end point is less than the predetermined value, and
wherein the stroke end portion begins at the end point and extends beyond the end point to a predicted next point.

16. The display apparatus according to claim 15, wherein the stroke end portion is a line segment with a decreasing line width.

* * * * *